United States Patent [19]

Osanai

[11] 4,434,447
[45] Feb. 28, 1984

[54] CASSETTE TAPE RECORDER

[75] Inventor: Akira Osanai, Hachioji, Japan

[73] Assignee: Olympus Optical Co., Ltd., Tokyo, Japan

[21] Appl. No.: 302,811

[22] Filed: Sep. 16, 1981

[30] Foreign Application Priority Data

Sep. 25, 1980 [JP] Japan ................... 55-133165

[51] Int. Cl.³ ................... G11B 00/00; G11B 15/04
[52] U.S. Cl. ........................... 360/137; 360/60; 360/90
[58] Field of Search ............ 360/137, 96.1–96.6, 360/60, 69; 242/191–200

[56] References Cited

U.S. PATENT DOCUMENTS

| 3,867,722 | 2/1975 | Syohji | 360/96.6 |
| 4,017,900 | 4/1977 | Katsurayana | 360/137 X |
| 4,106,064 | 8/1978 | Hoshido | 360/60 |
| 4,109,286 | 8/1978 | Katsurayana et al. | 360/96.6 |
| 4,161,007 | 7/1979 | Haraguchi | 360/137 |
| 4,227,222 | 10/1980 | Sato et al. | 360/137 |
| 4,348,704 | 9/1982 | Takagi et al. | 360/60 |
| 4,378,578 | 3/1983 | Shiozu et al. | 360/137 |

Primary Examiner—Aristotelis M. Psitos
Assistant Examiner—Kin Wong
Attorney, Agent, or Firm—Frishauf, Holtz, Goodman and Woodward

[57] ABSTRACT

A cassette tape recorder comprises a multi-function eject lever rotatably mounted on a base board. The eject lever is provided with a guide pin for pushing a cassette toward the heads by engagement with an engagement hole of a cassette held in a cassette holder, and a pair of lock members engageable with the corresponding engagement members of the cassette holder to lock it in an inserted position when it is shifted from an eject position. A cam for rotating the erroneous erasure preventing lever by being pressed against the lateral side thereof is formed on the eject lever in the vicinity of one of the lock members.

10 Claims, 20 Drawing Figures

CASSETTE TAPE RECORDER

BACKGROUND OF THE INVENTION

This invention relates to a cassette tape recorder, and more particularly to a cassette tape recorder provided with a kangaroo pocket type cassette holder.

With the above-mentioned type of cassette tape recorder, the cassette holder is pressed against a base board after a cassette is inserted into the cassette holder and is securely locked in a prescribed position. After being released from the locked position by the operation of an eject lever, the cassette holder is shifted to an eject position. The known eject lever generally has a function of only locking the cassette holder. The positioning of a cassette in the cassette holder or the elimination of the obstruction of the cassette ejection by an erroneous erasure preventing lever is undertaken by another constituent member of the cassette tape recorder. The above-mentioned operation is not directly related to that of the eject lever. With the conventional cassette tape recorder, therefore, it has been necessary to provide not only a cassette eject lever but also a member for positioning a cassette in the cassette holder and a member for eliminating the obstruction of the cassette ejection by the erroneous erasure preventing lever. Therefore, the conventional cassette tape recorder has the drawback that it involves a large number of parts, complicating the whole arrangement.

SUMMARY OF THE INVENTION

It is accordingly the object of this invention to provide a cassette tape recorder which is free of the aforementioned drawback accompanying the prior art. This is accomplished by enabling a cassette eject lever to perform many functions.

To attain the above-mentioned object, the present invention provides a cassette tape recorder, wherein the cassette eject lever is rotatably mounted on the base board and comprises at least two of the three integrally provided constituent members: a guide pin for defining the horizontal position of a cassette, a locking member for locking the cassette holder for engagement therewith, and a cam member for causing an erroneous erasure preventing lever to be rotated, thereby eliminating the obstruction of the cassette ejection by the erroneous erasure preventing lever.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

DETAILED DESCRIPTION OF THE PREFERRED EMBODIMENT

There will now be described, by reference to the accompanying drawing, a cassette tape recorder according to this invention.

Figure 1:
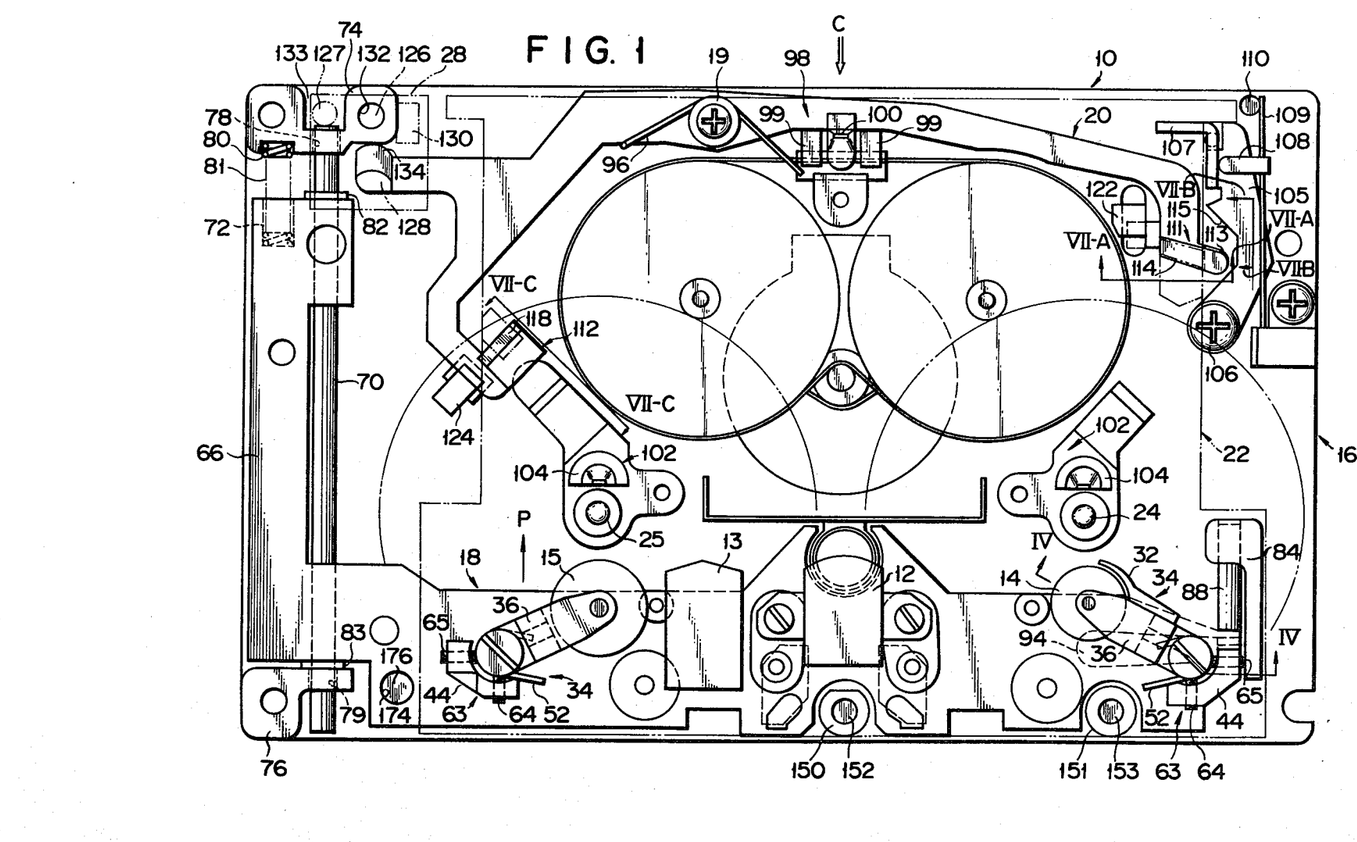
FIGS. 1 and 2 are schematic plan views of a cassette tape recorder embodying this invention at the stop mode and the play or record mode, respectively.
Figure 2:
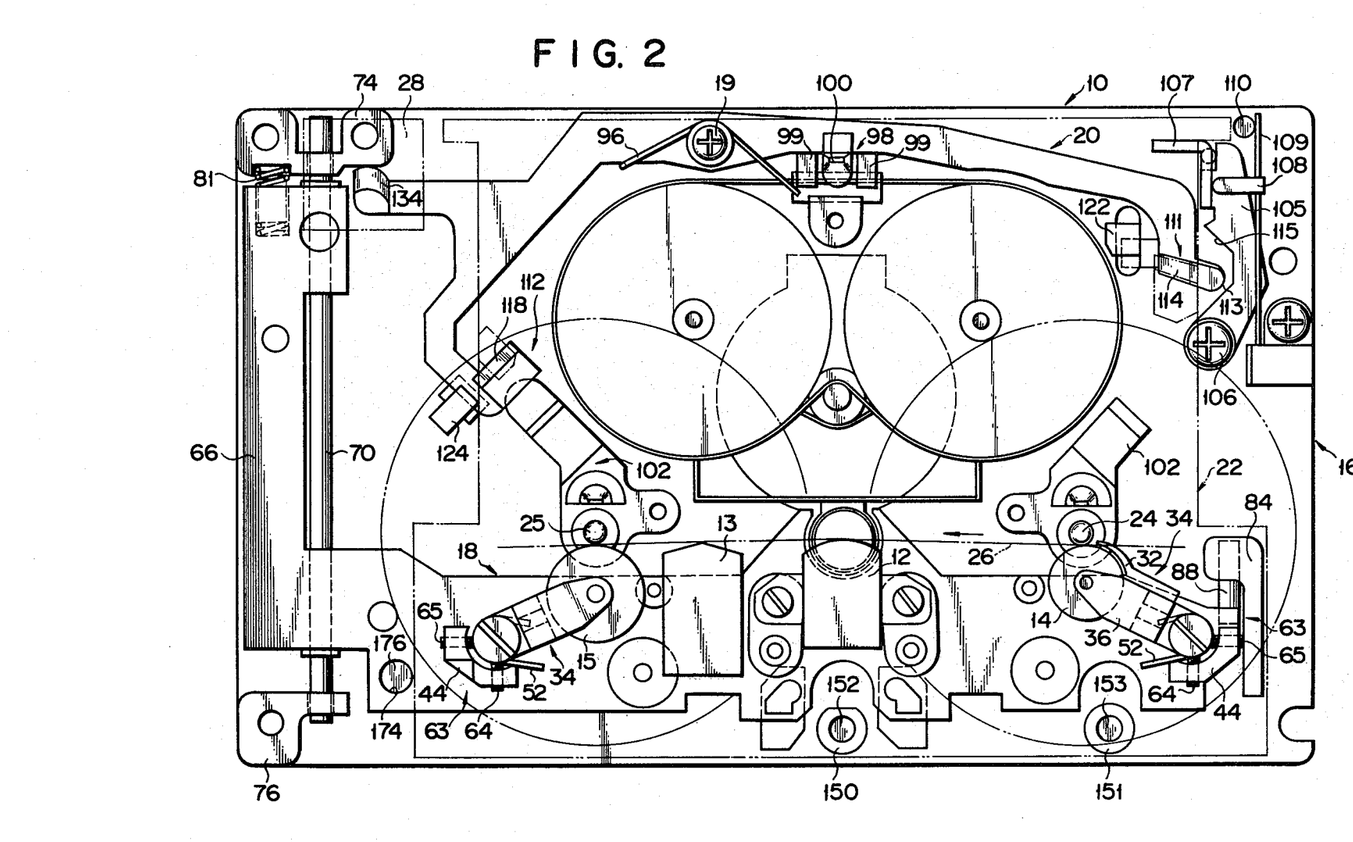

First, a brief description is given of the arrangement and operation of the cassette tape recorder 10. As shown in FIG. 1, a cassette tape recorder 10 comprises a head lever 18 slidably mounted on the base board 16 to support megnetic heads 12, 13 and pinch rollers 14, 15, and a cassette eject lever 20 rotatably mounted on the base board 16 by a pivotal pin 19. A swingable cassette holder 22 is mounted on the base board 16 in a state horizontally movable away from the base board. While kept in a lifted position, a cassette (not shown) is inserted into the cassette holder 22 in the direction of an indicated arrow C. Thereafter, the cassette holder 22 is pressed against the base board 16 and locked in a prescribed position by engagement with the cassette eject lever 20. Later, the cassette tape recorder is set at the play or record mode by letting the head lever 18 slide inward in the direction of an indicated arrow P and clamping a tape 26 between the pinch roller 14 and capstan shaft 24 and also between the pinch roller 15 and capstan shaft 25 (FIG. 2). At the play mode, the tape 26 runs in the direction of an arrow F indicated in FIG. 2. The cassette is ejected by depressing an eject button 28 toward the base board 16 and causing the eject lever 20 to swing counterclockwise about the pivotal pin 19. This swing of the eject lever 20 releases the cassette holder 22 from a position locked by the eject lever 20. As a result, the cassette holder 22 is kicked to commence a swing and shifted to a cassette ejecting position.

Figure 3:
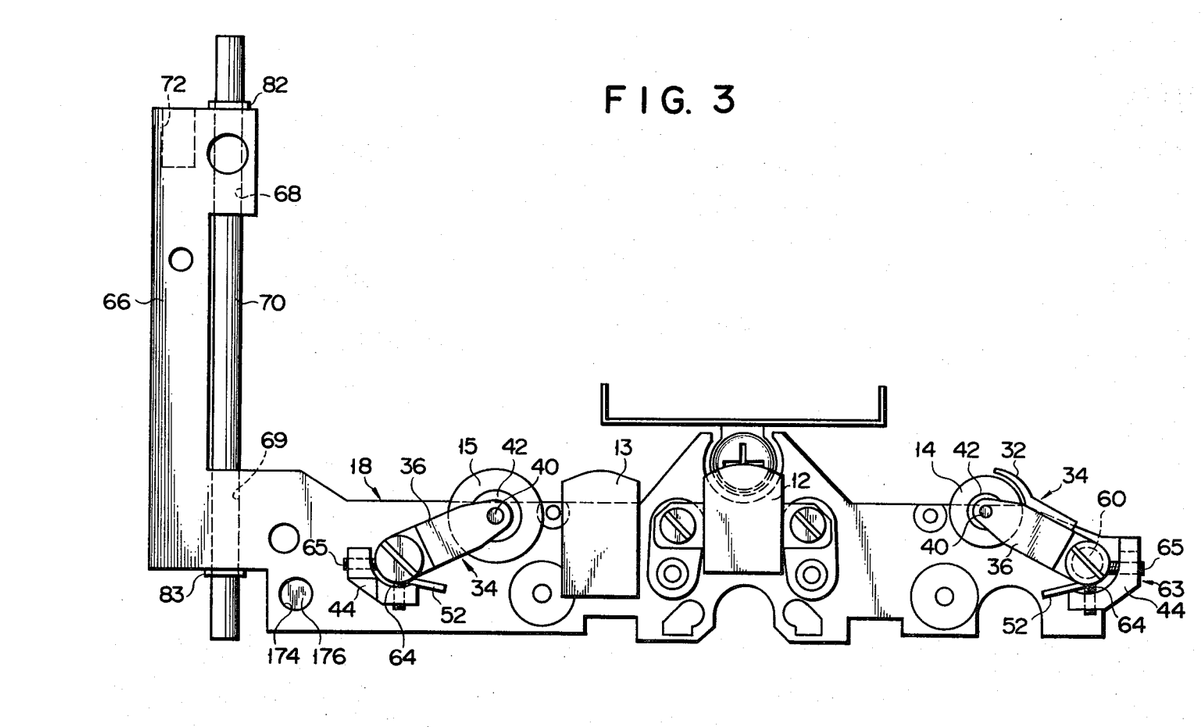
FIG. 3 is a top plan view of a head lever of the cassette tape recorder.

Detailed description is now given of the respective constituent members of the subject cassette tape recorder. Reference is first made to the head lever 18. As shown in FIG. 3, the head lever 18 supports the erase magnetic head 12 and recording-reproduction magnetic head 13 and also a pair of pinch rollers 14, 15. The pinch roller 14 set upstream as viewed from the running direction of the tape 26 (FIG. 2) is different from the downstream pinch roller 15 in that the upstream pinch roller 14 is provided with a tape guide 32 and has a smaller diameter than the downstream pinch roller 15. Since the upstream pinch roller 14 having a smaller diameter than the downstream pinch roller 15 is rotated at a lower circumferential speed than the latter, the running tape 26 is provided with a required tension. The upstream and downstream pinch rollers 14, 15 are supported by the corresponding pinch roller support mechanisms 34 having the same arrangement so that the inclination of the pinch rollers 14, 15 on a vertical plane can be adjusted. Description is now given of the arrangement of the pinch roller support mechanism 34 with reference to the upstream pinch roller 14. As seen from FIGS. 1, 3 and 4, particularly from FIG. 4, the pinch roller support mechanism 34 is provided with a fork-shaped support arm 36, which is rotatably held by a shaft 38 fixed to the head lever 18. A pinch roller shaft 40 is fixed to the support arm 36. The pinch roller 14 is rotatably supported by the pinch roller shaft 40 by means of a bearing 42. A screen-shaped upright wall 44 partly shielding the shaft 38 is erected from the head lever 18. A torsion coil spring 46 is wound about the shaft 38. One end 48 of the torsion coil spring 46 is inserted into a hole 50 of the support arm 36. The other end 52 of the torsion coil spring 46 is pressed against the end portion of the lateral side of the upright wall 44. The support arm 36 is so urged by the torsion coil spring 46 as to cause the pinch roller 14 to be rotated clockwise (FIG. 3) about the shaft 38. The support arm 36 comprises an integral downward extending projection 56 fitted with a shock-absorbing ring 54 made of, for example, polyvinyl chloride. The projection 56 is loosely inserted into a guide hole 58 formed in the head lever 18. Therefore, the support arm 36 is urged by the torsion coil spring 46, until the shock-absorbing ring 54 touches the lateral wall of the guide hole 58. Further, the support arm 36 can be rotated against the urging force of the torsion coil spring 46 in a space defined between the shock-absorbing ring 54 and guide hole 58. A screw 60 constituting part of the shaft 38 is threadedly engaged with the shaft, thereby adjusting the vertical movement of the support arm 36 relative to the shaft.

The pinch roller shaft 40 must be set parallel with the corresponding vertical capstan shaft 24 mounted on the base board 16. Otherwise, a tape clamped between the these shafts 24, 40 will be displaced upward or downward, failing to run properly. The capstan shaft 24 is mounted on the base board 16. The shaft 38 of the support arm 36 for the pinch roller shaft 40 is set on a different member, that is, a head lever sliding on the base board 16. Even where, therefore, a hole 62 into which the shaft 38 is forcefully inserted is rendered sufficiently vertical, the parallel relationship of the pinch roller shaft 40 with the capstan shaft 24 is not always assured. With the cassette tape recorder 10 of this invention, the shaft 38 is inclined beforehand toward the central portion of the upright wall 44, that is, in the direction of an arrow indicated in FIG. 3. The inclination of the shaft 38 toward the upright wall 44 can be effected by various processes, for example, by inclining the shaft 38, forcefully inserted into the hole 62 by manual effort, toward the upright wall 44 or forming the hole 62 itself in an inclined state. The shaft 38 thus inclined is pushed backward by parallelism-adjusting means 63 which adjusts the inclination of the shaft 38 to assure the proper parallelism of the shaft 38 with the capstan shaft 24. The parallelism-adjusting means 63 can sufficiently serve the purpose, provided it has a function of pressing the shaft 38 against its inclination, thereby to assure its parallelism with the pinch roller shaft 40. The parallelism-adjusting means 63 is provided with a pair of set screws 64, 65 which are threadedly engaged with the upright wall 44 and whose outer end is pressed against the lateral wall of the screw 60. The set screws 64, 65 are so positioned as to receive a component of a reaction force produced in the shaft 38 when it is pressed by the screw 60. The set screws 64, 65 adjust the magnitude of a pressure applied on the shaft 38, thereby assuring the parallelism of the pinch roller shaft 40. The parallelism adjusting means 63 provided with the above-mentioned set screws 64, 65 can easily and quickly assure the parallelism of the pinch roller shaft 40 by adjusting the extent to which the set screws 64, 65 are made to project. Further, the parallelism-adjusting means 63 allows for application of small pitch set screws, enabling a fine adjustment of the parallelism.

Figure 4:
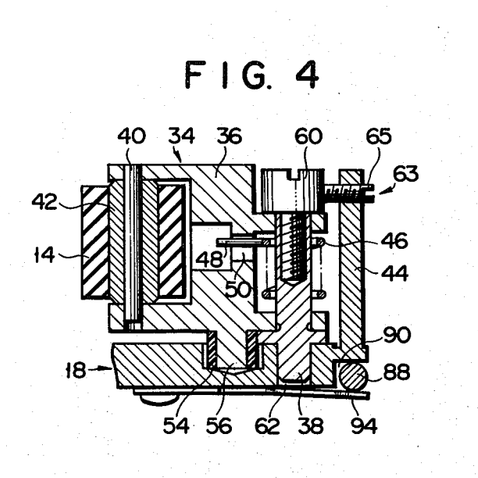
FIG. 4 is a longitudinal sectional view on line IV—IV of FIG. 1 of a pinch roller support mechanism set on the head lever.
Figure 5:
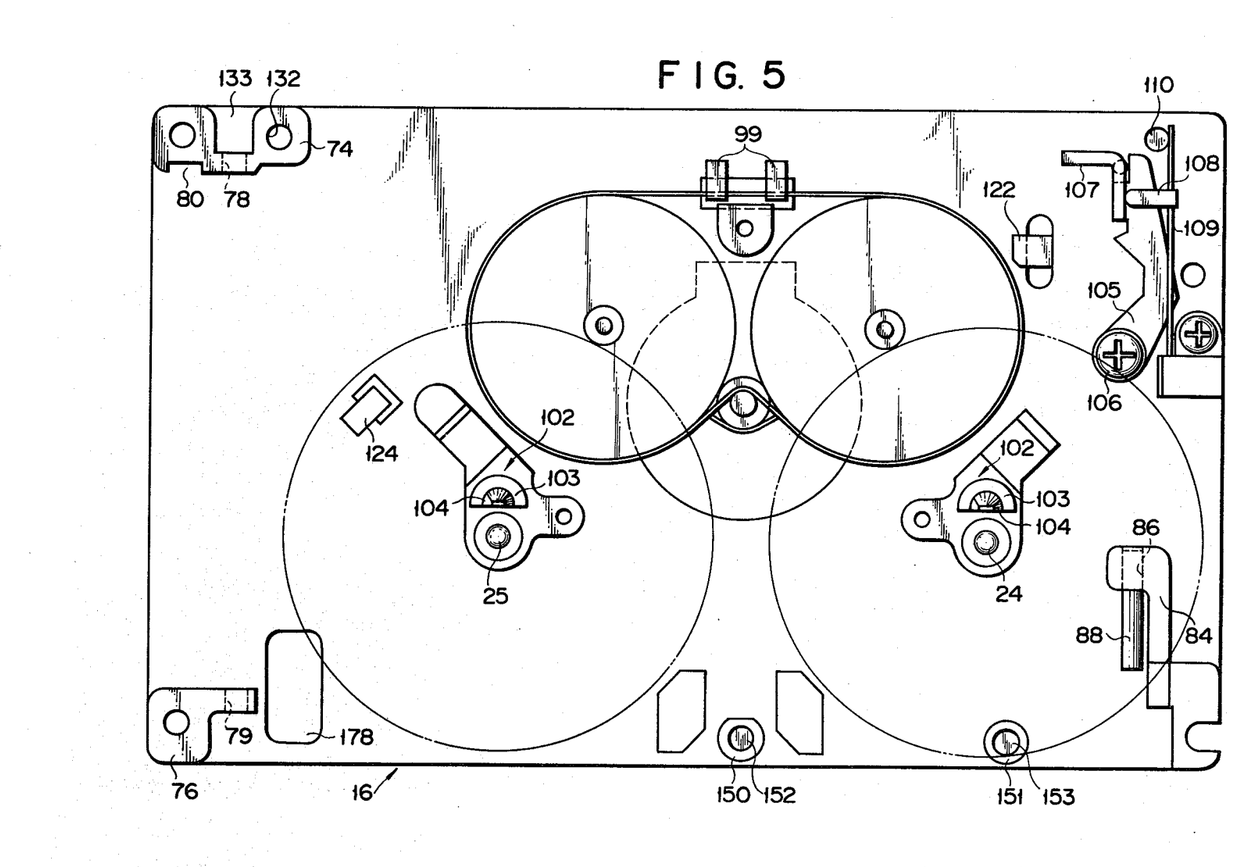
FIG. 5 is a schematic top plan view of the base board of the cassette tape recorder.
Figure 6:
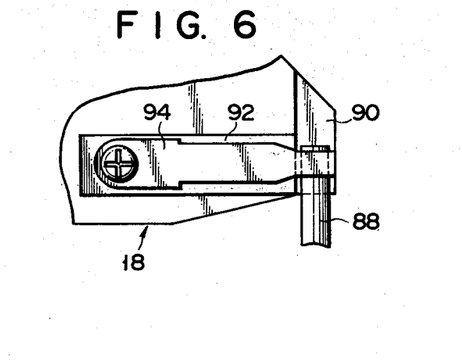
FIG. 6 is a fractional bottom plan view of the head lever, showing a plate spring.

The sliding of the head lever 18 is effected by the process described below. As shown in FIG. 3, the head lever 18 is provided at one end with an integral strip 66 extending first laterally of the head lever 18 and then at right angles thereto. A guide bar 70 is forcefully inserted into a hole 68 formed in the extending integral strip 66 and a hole 69 formed in the head lever 18 itself. The guide bar 70 is set at right angles to the head lever 18. A spring-receiving blind hole 72 is formed at a free end of the extending strip 66. As schematically indicated in FIG. 5, two upright walls 74, 76 are respectively built on both left sides of the base board 16. Guide holes 78, 79 are respectively formed in the upright walls 74, 76. A depression 80 is formed in the upright wall 74. A return spring 81 (FIG. 1) such as a compression coil spring is provided between the depression 80 and the spring-receiving blind hole 72 of the head lever 18. This return spring 81 may be wound about the guide bar 70 instead of being set between the depression 80 and spring-receiving blind hole 72. As indicated in FIG. 1, both ends of the guide bar 70 are loosely inserted into guide holes 78, 79, respectively, thereby enabling the guide bar 70 to slide along the surface of the base board 16. Reference numerals 82, 83 represent shock-absorbing plastics rings intended to suppress collisions between the head lever 18 and upright walls 74, 76 and also to define the position of the head lever. An upright wall 84 (FIG. 5) is formed at the right rear corner of the base board 16. Another guide bar 88 (FIG. 5) is forcefully inserted into a hole 86 formed in the upright wall 84. As shown in FIGS. 4 and 6, the guide bar 88 extends through a cavity 90 formed at the right end of the bottom wall of the head lever 18. As better shown in FIG. 6, a free end of a plate spring 94 held in a depression 92 formed in the bottom wall of the head lever 18 is pressed against the guide bar 88 to urge it toward the upper wall of the cavity 90. In other words, the other end portion of the head lever 18 is constructed in a fork-shaped form, one of whose arms is constituted by the plate spring 94. The guide bar 88 is held in the cavity 90 formed in the fork-shaped end portion of the head lever 18. Therefore, the head lever 18 is restricted in its vertical movement relative to the guide bar 88, but is made free to move in a horizontal direction. Namely, the head lever 18 has a certain degree of lateral movement.

As previously described, the head lever 18 is enabled to slide along the surface of the base board 16 by means of a pair of guide bars 70, 88. In this case, the head lever 18 is rigidly restricted in its vertical and horizontal movements relative to the guide bar 70, but is restricted only in its vertical movement relative to the guide bar 88, and is free to horizontally move, that is, has a certain degree of lateral movement. Accordingly, the head bar 18 can smoothly slide along the surface of the base board 16 against the urging force of the return spring 81 without scratching the guide bars 70, 88 to a position (FIG. 2) for the play or record mode. With the above-mentioned arrangement, it is unnecessary to try to assure an exact parallelism between the guide bars 70, 88. Therefore, the head lever 18 can slide properly by a simple and inexpensive arrangement.

With the foregoing embodiment, the guide bar 70 is fixed to the head lever 18, and the guide bar 88 is fixed to the base board 16. However, this invention is not limited to such an arrangement; obviously, both guide bars 70, 88 may be fixed to the head lever 18. In this case, the base board 16 should preferably be provided with a fork-shaped support section in order to hold the guide bar 88. Further, the plate spring 94 was made to constitute the lower arm of the fork-shaped end section. However, this arrangement need not be exclusively followed, and the plate spring 94 may constitute the upper arm of the fork-shaped end portion.

As previously described, the eject lever 20 is rotatably mounted on the base board 16 by means of the pivotal pin 19. As shown in FIG. 1, the torsion coil spring 96 is wound about the pivotal pin 19. One end of the torsion coil spring 96 is pressed against the lateral wall of the eject lever 20, and the other end of the torsion coil spring 96 is pressed against the lateral wall of a guide block 99 of a cassette guide 98. Therefore, the eject lever 20 is urged to rotate clockwise about the pivotal pin 19 by the torsion coil spring 96, and is locked in a prescribed position when the lateral wall of the eject lever 20 is pressed against the guide block 99.

The cassette guide 98 comprises a pair of guide blocks 99 erected from the base board 16 and a guide pin 100 which is formed on the lateral wall of the eject lever 20 with an inclined plane. As shown in FIG. 5, a pair of cassette guides 102 are mounted on the base board 16 in the vicinity of the capstan shafts 24, 25. Each cassette guide 102 is integrally provided with a flange-shaped guide block 103 and a guide pin 104 having an inclined plane. In this case, the inclined plane of the guide pin 100 is so shaped as to press a cassette inward, that is, downward in FIG. 1. In contrast, the inclined plane of the guide pin 104 is so shaped as to press the cassette outward, that is, upward in FIG. 1. The cassette guides 98, 102 define the horizontal and vertical movements of the cassette. When the bottom wall of the cassette is pressed against the flat planes of the guide blocks 99, 103, then the vertical movement of the cassette is defined. Where the guide pins 100, 104 are respectively inserted into the guide holes (not shown) of the cassette and the inclined planes of the guide pins 100, 104 are pressed against the lateral walls of the guide holes to push the cassette in a horizontal direction, then the horizontal position of the cassette is defined. In this case, the pair of guide pins 104 for defining the horizontal position of the cassette are made immovable, whereas the guide pin 100 for similarly defining the horizontal position of the cassette which is mounted on the rotatable eject lever 20 is made movable relative to the paired guide pins 104. As described above, of the three guide pins (the single guide pin 100, and paired guide pins 104) only the single guide pin 100 is not fixed, thereby making it possible to correct the positional displacement of the cassette in the cassette holder. With such an arrangement, it is not wlways necessary to accurately determine the relative positions of the three guide pins 104, 100, allowing for the easy working of the cassette tape recorder.

As seen from FIG. 5, the erroneous erasure preventing lever 105 is rotatably mounted on the base plate 16 by means of the pivotal pin 106. The erroneous erasure preventing lever 105 is provided at its free end with an integrally formed feeler member 107 which is made insertible into a hole (not shown) produced after the removal of an erroneous erasure preventing lug formed on a lateral wall of the cassette. The erroneous erasure preventing lever 105 undergoes an urging force of a switch 109 through a plastic pressing member 108. Where the feeler member 107 is inserted into the hole produced after the removal of the erroneous erasure preventing lug, then the switch 109 is pressed against a stopper 110 mounted on the base board 16. Under this condition, current for the erase head 12 escapes to the base board 16, and consequently the erase head 12 does not effectively function, thereby preventing erroneous erasure.

Figures 7A, 7B, 7C:
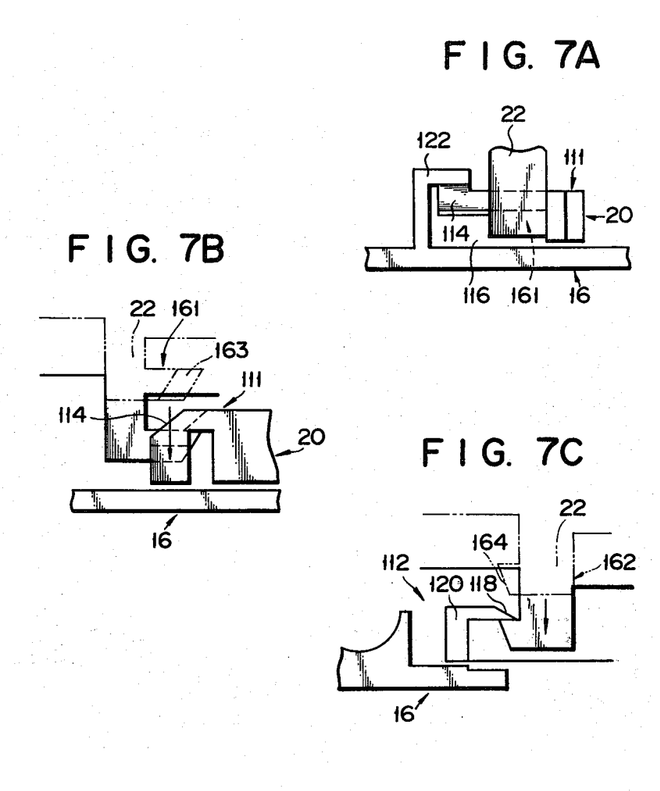
FIGS. 7A to 7C are fractional longitudinal sectional views of the cassette tape recorder on lines VII A—VII A, VII B—VII B and VII C—VII C of FIG. 1, respectively.

As seen from FIG. 1, the eject lever 20 is provided at both ends with a pair of lock members 111, 112 for locking a cassette holder 22. As shown in FIGS. 7A and 7B, the lock member 111 comprises an inclined plane 114 and a cavity 116. As indicated in FIG. 7C, the lock member 112 comprises an inclined plane 118 and a cavity 120. The klock member 111 also acts as a cam member provided with a partially columnar cam 113 (FIG. 2) at the end. The cam 113 is made engageable with a cam surface 115 formed in the lateral wall of the erroneous erasure preventing lever 105. The eject lever 20 is prevented from floating above the base board 16 by vertically inverted L-shaped blocks 122, 124 mounted on the base board 16 (FIG. 7A). Description is later given of the manner in which the cassette holder 22 is locked by the eject lever 20.

Figure 8:
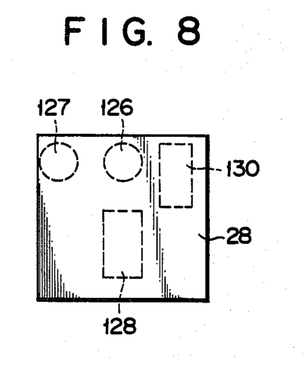
FIG. 8 in a top plan view of an eject button.
Figure 9:
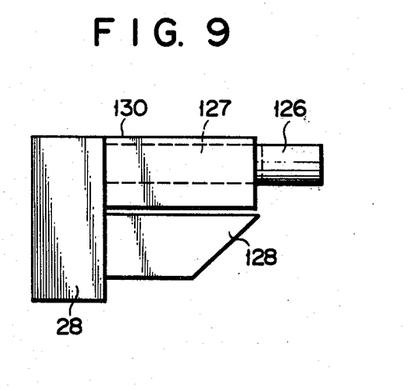
FIG. 9 is a right side view of the same.

As indicated in FIGS. 8 and 9, an eject button 28 for actuating the eject lever 20 is integrally provided with larger and smaller guide pins 126, 127, cam member 128 and rectangular guide 130. All these members extend from the bottom plane of the eject button 28. As shown in FIG. 1, the eject button 28 is mounted on the base board 16 such that the longer guide pin 126 is loosely inserted into a guide hole 132 formed in the upright wall 74 of the base board 16, and the shorter guide pin 127 is inserted into a cavity 133 formed in the upright wall 74. The eject lever 20 is provided with an inclined plane engageable with the cam member 128 of the eject button 28. Therefore, when the eject button 28 is depressed, the cam member 128 is engaged with an inclined plane 134 (FIG. 1), causing the eject lever 20 to be rotated counterclockwise against the urging force of the torsion coil spring 96. As a result, the cassette holder is released from a state locked by the eject lever 20. Further when the eject button 28 is depressed, the guide pin 127 falls in front of the guide bar 70 to obstruct the travelling path of the guide bar 70, thereby preventing the malfunction of the cassette tape recorder, that is, the advance of the head lever 18 when the cassette is ejected. When the eject button 28 is further depressed, the rectangular guide 130 falls by being guided along the right lateral plane of the upright wall 74, thereby stopping the rotation of the eject button.

Figure 10:
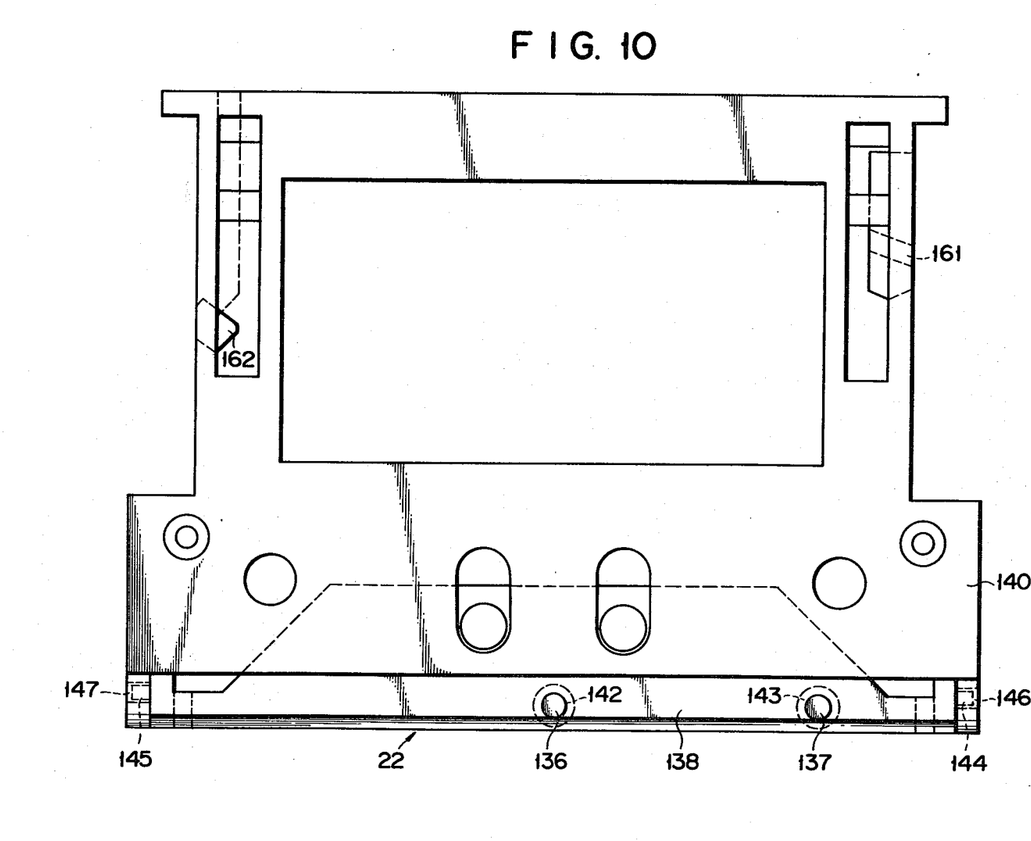
FIG. 10 is a top plan view of the cassette holder.
Figures 11, 14:
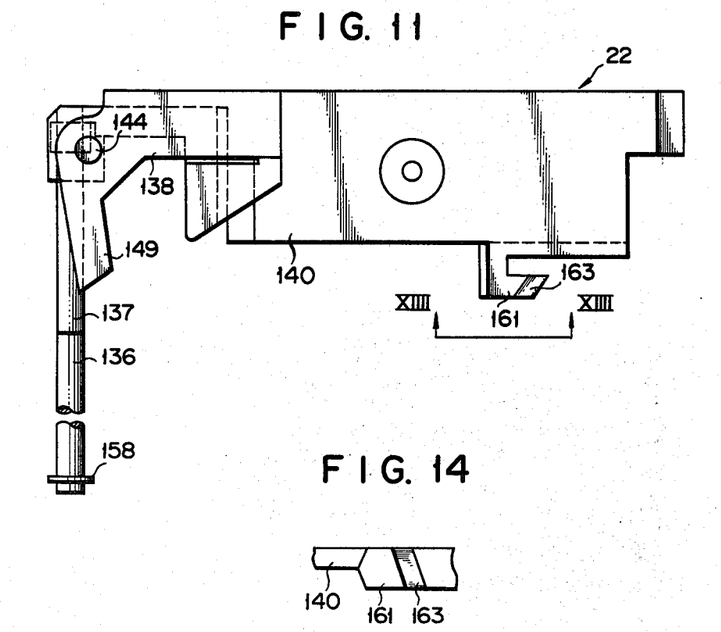
FIG. 11 is a right side view of the same.
FIG. 14 is a fractional bottom plan view on line XIV—XIV of FIG. 11 of the cassette holder body.
Figure 12:
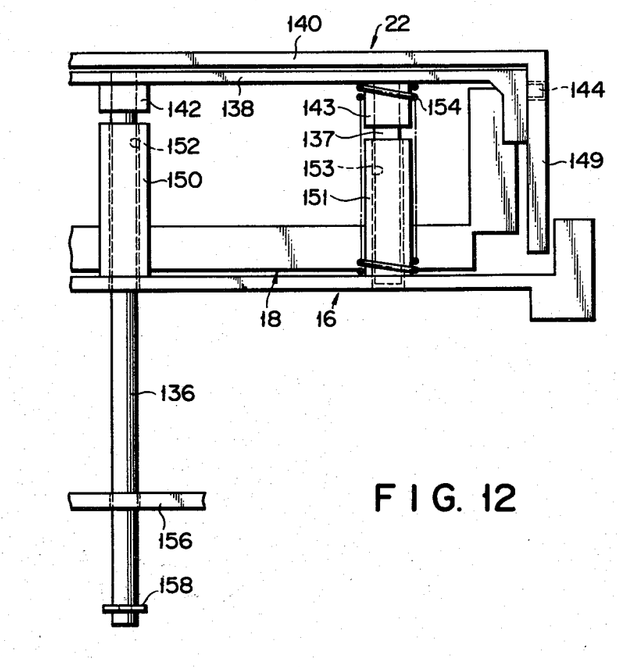
FIG. 12 is a fractional front view of the same.

As seen from FIGS. 10, 11 and 12, the cassette holder 22 comprises an aluminium fitting member 138 provided with longer and shorter guide bars 136, 137 and a plastic cassette holder body 140 swingably fitted to the aluminium fitting member 138. The aluminium fitting member 138 is provided on the bottom wall with integrally formed sleeves 142, 143 for preventing the fall of the guide bars 136, 137 and at both ends with integrally formed pivotal pins 144, 145. Where the pivotal pins 144, 145 are respectively inserted into holes 146, 147, the cassette holder body 140 is swingably fitted to the fitting member 138. Where the guide bars 136, 137 are loosely inserted into guide holes 152, 153 (FIG. 5), respectively, formed in the cylindrical upright walls 150, 151 erected on the base board 16, the fitting member 138 is mounted on the base board 16 so as to be movable in parallel thereto. A kick spring 154 such as a compression coil spring is wound about the guide bar 137 through the sleeve 143 and cylindrical upright guide wall 151. However, the kick spring 154 may be wound about the guide bar 136 through the upright guide wall 150. The guide bar 136 extends through the guide hole 152 of the upright cylindrical guide wall 150 and also through a plunger fitting board 156 set below the base board 16. The free end of the guide bar 136 is fitted with a fall-preventing ring, for example, a snap ring 158. When the cassette holder 22 is forcefully set in a position for the play or record mode, then the kick spring 154 is compressed to have its urging force fully accumulated in advance. Therefore, when the cassette holder 22 is ejected, the kick spring 154 kicks the cassette holder 22 outward by the accumulated urging force. When the snap ring 158 of the guide bar 136 is pressed against the plunger-fitting board 156 and the fitting member 138 is suddenly brought to rest, the cassette holder body 140 swings about the pivotal pins 146, 147 by an inertial force, and is shifted to an eject position indicated by a two-dot chain line in FIG. 13. The snap ring 158 may be so positioned as to be pressed against the base board 16 instead of against the plunger-fitting board 156.

Figure 13:
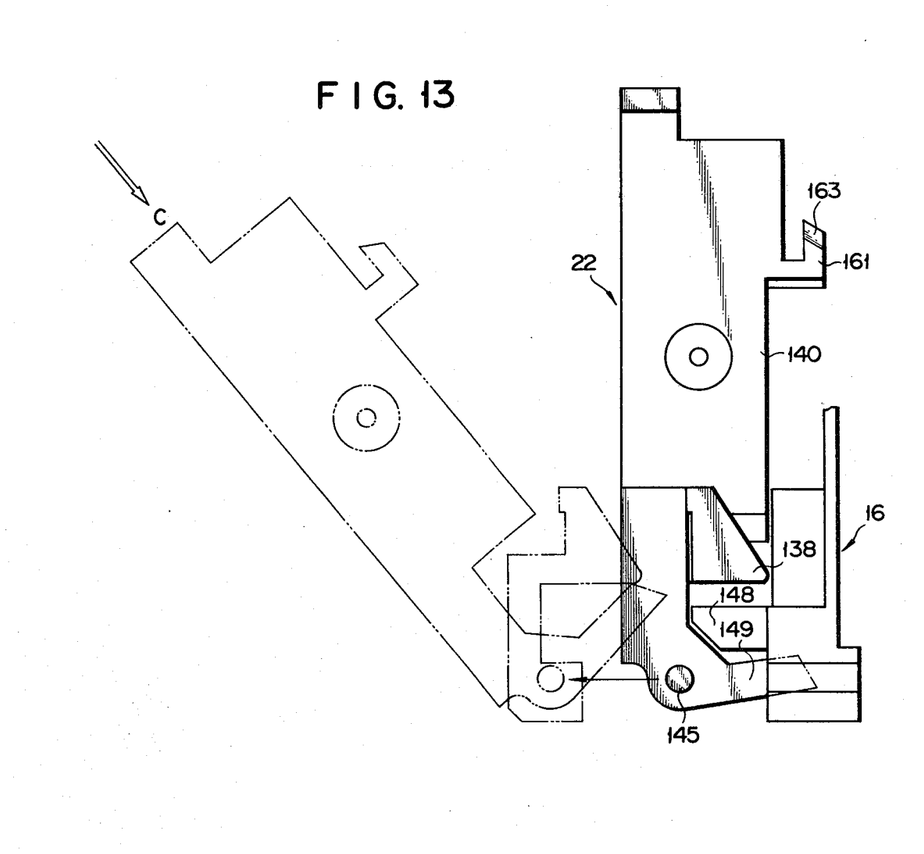
FIG. 13 illustrates the operation of the cassette holder when the cassette is ejected.
Figure 15:
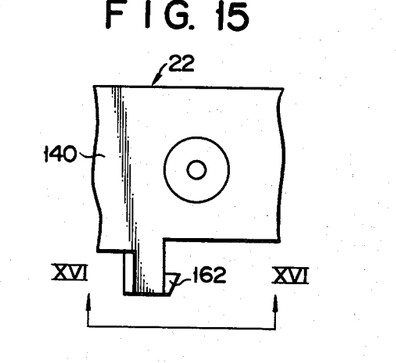
FIG. 15 is a fractional left side view of the cassette holder.
Figure 16:
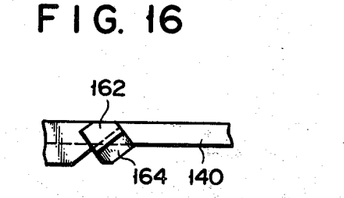
FIG. 16 is a fractional bottom plan view of the same on line XVI—XVI of FIG. 15.

As shown in FIG. 13, a guide wall 148 having an inclined plane extends over the base board 16. Further, a projecting member 149 having an inclined plane is formed on the cassette holder body 140. When the inclined plane of the projecting member 149 slides along the inclined plane of the guide wall 148, then the cassette holder body 140 can swing smoothly. When the cassette holder body 140 begins to swing, the other end of the projecting member 149 is positioned more inward than the guide wall 148. Therefore, when an operator attempts to push the cassette holder body 140 in a swinging state without setting the cassette holder body 140 parallel to the base board 16, then the projecting member 149 is pressed against the guide wall 148, thereby preventing the cassette holder 22 from being brought down and completely preventing the malfunction of the cassette tape recorder.

The cassette holder body 140 is integrally provided with engagement members 161, 162 to be locked with the corresponding lock members 111, 112 of the eject lever 20. As seen from FIGS. 11, 14, 15 and 16, the engagement members 161, 162 are respectively provided with downward extending inclined planes 163, 164. Further, as shown in FIGS. 1, 7A, 7B and 7C, the cassette holder body 140 is so positioned as to cause the inclined planes 163, 164 directed toward the lower part of the engaging members 161, 162 to face the inclined planes 114, 118 directed toward the upper part of the lock members 111, 112 of the eject lever 20. Where, therefore, after the insertion of the cassette into the cassette holder 22, the cassette holder is pushed down to be set at the stop mode shown in FIG. 1, the inclined planes 163, 164 of the engagement members 161, 162 are respectively moved in the directions of indicated arrows, as shown by two-dot chain lines, to be pressed against the inclined planes 114, 118 of the corresponding lock members 111, 112. The eject lever 20 is slightly rotated counterclockwise in FIG. 1 against the urging force of the torsion coil spring 96 due to a wedging action exerted by the mutually facing inclined planes. This rotation of the eject lever 20 causes the engagement members 161, 162 to be fitted into the cavities 116, 120 of the corresponding lock members 111, 112. Under this condition, the eject lever 20 is rotated clockwise by the urging force of the torsion coil spring 96 to regain its original position, causing the lock members 111, 112 of the eject lever 20 to cover the upper parts of the engagement members 161, 162. The resultant descent of the cassette holder 22 compresses the kick spring 154. Therefore, the engagement members 161, 162, though urged outward, are depressed by the overlying lock members 111, 112 to be locked in an unreleased state as indicated by solid lines in FIGS. 7B and 7C.

Figure 17:
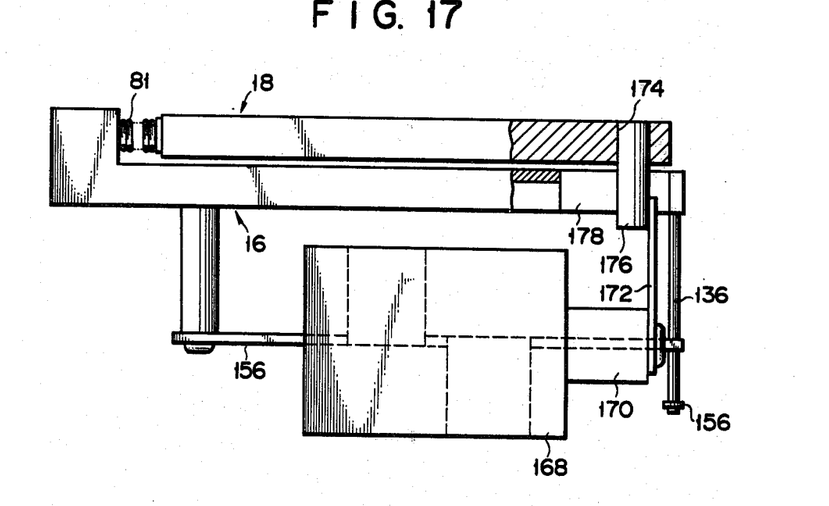
FIG. 17 is a schematic left side view of the cassette tape recorder.

Fixed to a fitting board 156 is a plunger mechanism 168 (FIG. 17), which comprises a plunger slidable inward by an energized solenoid, and to the end of which a connection board 172 is bolted. The movement of the head lever 18 is controlled by the plunger mechanism 168. The head lever 18 is provided with a downward extending actuating rod 176 forcefully inserted into a hole 174. An elongate guide hole 178 for the actuating rod 176 is formed in the base board 16. The inner end of the connection board 172 is pressed against the peripheral surface of the actuating rod 176 on the outside thereof. When the solenoid of the plunger mechanism 160 is energized to push the plunger 170 inward, the actuating rod 176, pushed by the connection board 172, is moved inward together with the plunger 170. The head lever 18 is shifted inward against the urging force of the return spring 81. As a result, the heads 12, 13 mounted on the head lever 18 are pressed against the tape 26 clamped between the capstan shafts 24, 25 for the play or record mode.

Figure 18:
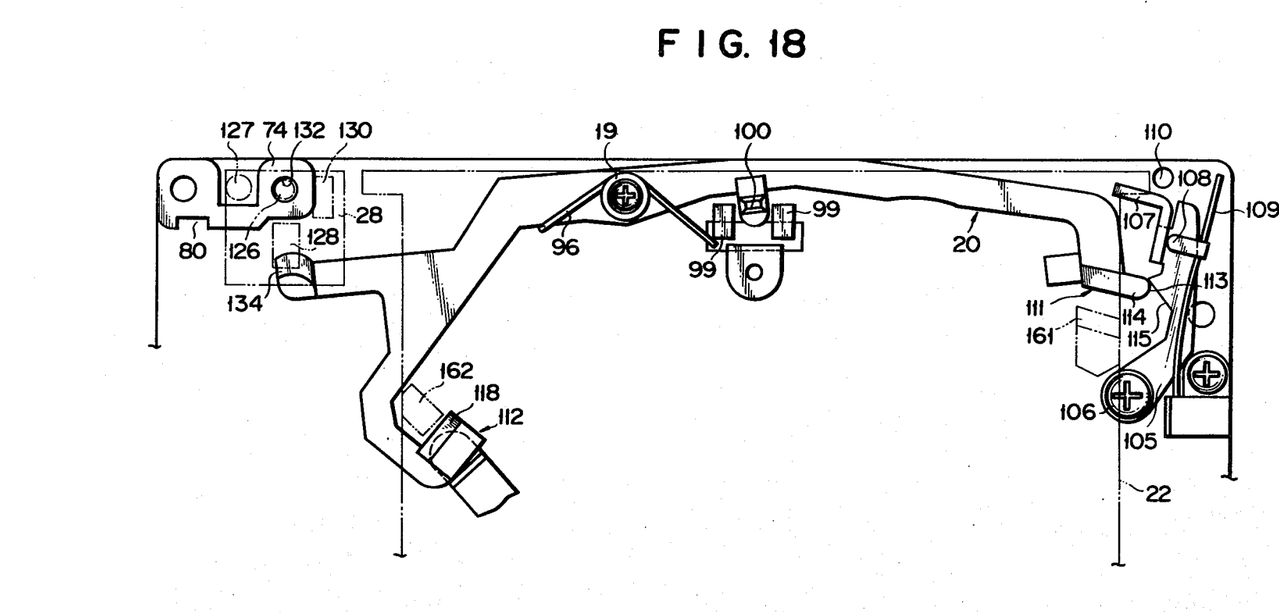
FIG. 18 is a schematic fractional top plan view of the cassette tape recorder when the cassette is ejected.

The cassette tape recorder 10 embodying this invention is operated in the following manner. A cassette held in an eject position indicated by the two-dot chain line given in FIG. 13 is inserted into the cassette holder 22 in the direction of an indicated arrow C with the cassette opening directed inward. Thereafter, the cassette holder body 140 is made to swing to occupy a position parallel with the base board 16. Later, the cassette is pushed toward the base board 16 against the urging force of the kick spring 154 (FIG. 12). When the cassette holder 22 is pushed, as seen from FIGS. 7A, 7B and 7C the engagement members 161, 162 of the cassette holder 22 are locked by the lock members 111, 112 of the eject lever 20 for a stop mode shown in FIG. 1. When the solenoid of the plunger mechanism 168 is energized after the locking of the cassette holder 22, the plunger 170 (FIG. 17) slides inward, causing the head lever 18 to be moved in the direction of the arrow P given in FIG. 1 while being guided by the guide bars 70, 88. The tape 26 is clamped between the pinch rollers 14, 15 as well as between the capstan shafts 24, 25 for a play or record mode (FIG. 2). When the end of a tape is reached, the solenoid is deenergized, and the head lever 18 is returned to the stop mode (FIG. 1) by the urging force of the return spring 81 which has been sufficiently compressed up to this point. When the eject button 28 is pushed after the stop mode is set, then the cam member 128 of the eject button 28 contacts the inclined plane 134 of the eject lever 20. The eject lever 20 is rotated counterclockwise in FIG. 18 about the pivotal pin 19 by the wedge action jointly exerted by the cam member 128 and inclined plane 134. The counterclockwise rotation of the eject lever 20 causes the lock members 111, 112 of the eject lever 20 to be shifted sidewise from the lock position in which they cover the upper portions of the engagement members 161, 162 of the cassette holder 22 to release it from a locked state. When at this time, the feeler member 107 of the erroneous erasure preventing lever 105 is not inserted into a hole produced after the removal of the erroneous erasure preventing lug, then the cassette holder 22 is moved in parallel with the base board 16 by the urging force of the kick spring 154, while being guided by the guide bars 136, 137. At this time, the snap ring 158 is pressed against the immovable plunger fitting board 156 (FIG. 12), causing the fitting member 138 of the cassette holder 22 to be instantly brought to cost. Under this condition, the cassette holder body 140 begins to swing on the fitting member 138 due to the inertial force, thereby occupying an eject position (indicated by the two-dot chain line given in FIG. 13) to be finally ejected.

If, at the ejection of the cassette, the feeler member 107 of the erroneous erasure preventing lever 105 is inserted into a hole produced after the removal of the erroneous erasure preventing lug, then the feeler member 107 is released from the hole by the rotation of the eject lever 20 caused by the depression of the eject button 28. Where the eject lever 20 is rotated counterclockwise about the pivotal pin 19, then the cam 113 of the lock member 111 of the eject lever 20 is pressed against the cam surface 115 of the erroneous erasure preventing lever 105, causing this lever to be rotated clockwise in FIG. 18 about the pivotal pin 106. This clockwise rotation of the erroneous erasure preventing lever 105 disengages the feeler member 107 from a hole produced by the removal of the erroneous erasure preventing lug, thereby enabling the ejection of the cassette.

As mentioned above according to this invention, the eject lever 20 is integrally provided with the guide pin 100 for defining the horizontal position of the cassette, lock members 111, 112 for locking the cassette holder 22 by engagement therewith, and the cam member 113 for causing the erroneous erasure preventing lever 105 to be rotated, thereby eliminating the obstruction of the cassette ejection caused erroneous erasure preventing lever 105. Therefore, the cassette is ejected easily and quickly by a simple arrangement. However, the eject lever 20 need not always be provided with all of the above-mentioned three kinds of members. Provision of using only two of the above three kinds of members can provide substantially the same improvement as when all three kinds are used.

With the cassette tape recorder of this invention, the eject lever 20 is made to carry out many functions. Namely, the single operation of the eject lever 20 enables more than two actions to be taken at the same time, thereby elevating the operability of the cassette tape recorder. Accordingly, this invention decreases the number of parts and provides a simplified and compact cassette tape recorder. With the illustrated embodiment of this invention, one of the paired lock members 111, 112 is made to concurrently act as a cam, thereby simplifying the arrangement of the subject cassette tape recorder.

What is claimed is:

1. In a cassette tape recorder comprising a kangaroo pocket type cassette holder for receiving a cassette having an erroneous erasure preventing lug which is removable to produce a hole in the cassette, the cassette holder being movable between an inserted position and an eject position; an eject lever rotatably mounted on a base board and which is rotatable to an eject mode to eject a cassette from the tape recorder; and an erroneous erasure preventing lever provided with a feeler member insertible into a hole in a cassette produced by the removal of the erroneous erasure preventing lug of the cassette, said erroneous erasure preventing lever being rotatably mounted on the base board;

the improvement wherein:

said cassette holder is integrally provided with at least one engagement member; and said eject lever is a multi-function eject lever which includes a single eject lever having at least two of the following three members integrally formed thereon:

at least one guide pin member integrally formed on said single eject lever for pushing a cassette toward the heads of the tape recorder by engagement with a corresponding guide hole formed in the cassette holder;

at least one lock member integrally formed on said single eject lever and engageable with said at least one engagement member of the cassette holder to lock the cassette holder in an inserted position when the cassette holder is moved to the inserted position from an eject position; and a cam integrally formed on said single eject lever and which, when the feeler member of the erroneous erasure preventing lever is inserted into said hole in the cassette which is produced by the removal of the erroneous erasure preventing lug, and when the single eject lever is rotated for the eject mode, is pressed against the erroneous erasure preventing lever to cause rotation of the erroneous erasure preventing lever in such a direction as to cause removal of the feeler member from said hole in the cassette which is produced by the removal of the erroneous erasure preventing lug, thereby permitting free removal of the cassette from the cassette holder.

2. The cassette tape recorder of claim 1, wherein:

said single eject lever includes at least said guide pin integrally formed thereon;

said cassette holder comprises two of said engagement members which extend downward, each of said engagement members being provided at the lower end thereof with an inclined plane directed toward the lower part of the respective engagement members;

said guide pin of the single eject lever is provided with an inclined plane directed toward the heads of the tape recorder; and said single eject lever is further provided with two lock members which are respectively provided with inclined planes facing the corresponding inclined planes of the engagement members of the cassette holder and cavities engageable with the corresponding engagement members of the cassette holder.

3. The cassette tape recorder of claim 1, wherein:
said single eject lever includes at least said cam member integrally formed thereon;
said single eject lever having a lock member provided at one end of the single eject lever;
said cam member being integrally formed on the lateral side of said lock member and being engageable with a cam surface formed on a lateral side of the erroneous erasure preventing lever to rotate said erroneous erasure preventing lever to cause said feeler member to be removed from said hole in said cassette.

4. The cassette tape recorder of claim 3, wherein said single eject lever has a further inclined planed formed at the other end thereof; and further comprising an eject button slidably mounted on the base board, said eject button having a cam member thereon which is pressed against said further inclined plane of said single eject lever upon operation of said eject button to cause the single eject lever to rotate on the base board against an urging force applied to the single eject lever.

5. The cassette tape recorder of claim 2, wherein:
said single eject lever includes at least said cam member integrally formed thereon, said cam being formed on the lateral side of at least one of said lock members and being engageable with a cam surface formed on a lateral side of the erroneous erasure preventing level to rotate said erroneous erasure preventing lever to cause said feeler member to be removed from said hole in said cassette.

6. The cassette tape recorder of any one of claim 1, 2, 3, 4 or 5, wherein said single eject lever includes all of said at least one guide pin member, said at least one lock member and said cam member integrally formed thereon.

7. The cassette tape recorder of claim 4, comprising biasing means for applying said urging force to said single eject lever in such a direction so as to bias said single eject lever in a direction away from its eject mode position.

8. The cassette tape recorder of claim 1, comprising biasing means for applying said urging force to said single eject lever in such a direction so as to bias said single eject lever in a direction away from its eject mode position.

9. The cassette tape recorder of claim 1, wherein said single eject lever comprises an elongated lever having opposite end portions and which is pivotally mounted to said base board at a point intermediate said end portions thereof; and further comprising spring means for biasing said eject lever in a direction about the pivotal mounting point so as to bias the eject lever in a direction away from its eject mode position.

10. The cassette tape recorder of claim 9, wherein said elongated eject lever comprises said at least one guide pin integrally formed on said single eject lever at a position intermediate the end portions of said single eject lever; a pair of said lock members integrally formed on respective opposite end portions of said single eject lever; and said cam integrally formed on said single eject lever at one of said end portions thereof and in the vicinity of one of said lock members, said cam being engageable with said erroneous erasure preventing lever when said single eject lever is rotated against said biasing force to thereby cause said feeler member of said erroneous erasure preventing lever to be removed from said hole in said cassette which is produced by the removal of the erroneous erasure preventing lug of the cassette.

* * * * *